United States Patent
Galle et al.

(10) Patent No.: US 11,797,591 B2
(45) Date of Patent: Oct. 24, 2023

(54) ABSTRACTIVE MULTI-DOCUMENT SUMMARIZATION THROUGH SELF-SUPERVISION AND CONTROL

(71) Applicant: NAVER CORPORATION, Seongnam-si (KR)

(72) Inventors: Matthias Galle, Eybens (FR); Maximin Coavoux, Grenoble (FR); Hady Elsahar, Grenoble (FR)

(73) Assignee: NAVER CORPORATION, Seongnam-si (KR)

( * ) Notice: Subject to any disclaimer, the term of this patent is extended or adjusted under 35 U.S.C. 154(b) by 411 days.

(21) Appl. No.: 17/193,748

(22) Filed: Mar. 5, 2021

(65) Prior Publication Data
US 2021/0342377 A1  Nov. 4, 2021

(30) Foreign Application Priority Data
Apr. 30, 2020 (EP) .................... 20305417

(51) Int. Cl.
*G06F 16/30* (2019.01)
*G06F 16/34* (2019.01)
*G06F 16/35* (2019.01)
*G06N 3/088* (2023.01)

(52) U.S. Cl.
CPC .......... *G06F 16/345* (2019.01); *G06F 16/35* (2019.01); *G06N 3/088* (2013.01)

(58) Field of Classification Search
CPC ........ G06F 16/345; G06F 16/35; G06F 40/58; G06N 20/10; G06N 20/20; G06N 3/045; G06N 3/08; G06N 3/088; G06N 7/01
See application file for complete search history.

(56) References Cited

U.S. PATENT DOCUMENTS

| | | |
|---|---|---|
| 2012/0303796 A1 | 11/2012 | Mo et al. |
| 2019/0287012 A1 | 9/2019 | Celikyilmaz et al. |
| 2022/0067284 A1* | 3/2022 | He .................. G06F 40/284 |

OTHER PUBLICATIONS

Article entitled "Conditional Augmentation for Aspect Term Extraction via Masked Sequence-to-Sequence Generation", by Li et al., dated Apr. 30, 2020 (Year: 2020).*
Article entitled "Self-Supervised and Controlled Multi-Document Opinion Summarization", by Elsahar et al., dated May 1, 2020 (Year: 2020).*
Article entitled "Massive Multi-Document Summarization of Product Reviews with Weak Supervision", by Shapira et al., dated Jul. 22, 2020 (Year: 2020).*

(Continued)

*Primary Examiner* — Mahesh H Dwivedi
(74) *Attorney, Agent, or Firm* — Greer, Burns & Crain, Ltd.

(57) ABSTRACT

A method for generating enriched training data for a multi-source transformer neural network for generation of a summary of one or more passages of input text comprises creating, from a plurality of input text sets, training points each comprising an input text subset of the input text set and a corresponding reference input text from the input text set, wherein the size of the input text subset is a predetermined number. Control codes are selected based on reference features corresponding to categorical labels of reference texts in the created training points. The input text is enriched with the selected control codes to generate enriched training data.

30 Claims, 10 Drawing Sheets

(56) References Cited

OTHER PUBLICATIONS

Ramos, J., 'Using TF-IDF to Determine Word Relevance in Document Queries,' Proceedings of the first instructional conference on machine learning, vol. 242, Piscataway, NJ, 2003, pp. 133-142.
Ranzato, M., et al., 'Sequence Level Training with Recurrent Neural Networks,' ICLR 2016, published on ArXiv.org as 1511.06732, May 6, 2016, 16 pages.
Rohrbach, A., et al., 'Object Hallucination in Image Captioning,' Proceedings of the 2018 Conference on Empirical Methods in Natural Language Processing, Brussels, Belgium: Association for Computational Linguistics, Oct. 31-Nov. 4, 2018, pp. 4035-4045.
Rossiello, G., et al., 'Centroid-Based Text Summarization through Compositionality of Word Embeddings,' Proceedings of the MultiLing 2017 Workshop on Summarization and Summary Evaluation Across Source Types and Genres, Valencia, Spain, Association for Computational Linguistics, Apr. 3, 2017, pp. 12-21.
See, A., et al., 'What Makes a Good Conversation? How Controllable Attributes Affect Human Judgments,' Proceedings of the 2019 Conference of the North, Minneapolis, Minnesota: Association for Computational Linguistics, Jun. 2-Jun. 7, 2019, pp. 1702-1723.
Tibshirani, R., "Regression Shrinkage and Selection via the Lasso," Journal of the Royal Statistical Society, Series B (Methodological), vol. 58, No. 1, 1996, pp. 267-288.
Vaswani, A., et al., 'Attention Is All You Need,' Advances in neural information processing systems, NIPS 2017, 2017, pp. 5998-6008.
Wang, L., et al., 'Neural Network-Based Abstract Generation for Opinions and Arguments,' Proceedings of the 2016 Conference of the North American Chapter of the Association for Computational Linguistics, Human Language Technologies, San Diego, California, Association for Computational Linguistics, Jun. 12-17, 2016, pp. 47-57.
West, P., e al., "Bottle-Sum: Unsupervised and self-supervised sentence summarization using the information bottleneck principle," Proceedings of the 2019 Conference on Empirical Methods in Natural Language Processing and the 9th International Joint Conference on Natural Language Processing (EMNLP-IJCNLP), Hong Kong, China, Nov. 3-7, 2019. Association for Computational Linguistics, pp. 3750-3759.
Williams, R. J., "Simple statistical gradient-following algorithms for connectionist reinforcement learning," Machine Learning, 8(3-4), 1992, pp. 229-256.
Wu, L., et al., 'Adversarial Neural Machine Translation,' Proceedings of the 10th Asian Conference on Machine Learning Research, ACML 2018, Beijing, China, Nov. 14-16, 2018, pp. 534-549.
Wu, Y., et al., "Google's neural machine translation system: Bridging the gap between human and machine translation," published in Arxiv.org as 1609.08144, Oct. 8, 2016, 23 pages.
Yang, Z., et al., 'Unsupervised Text Style Transfer Using Language Models as Discriminators,' Advances in Neural Information Processing Systems 31: Annual Conference on Neural Information Processing Systems 2018, NeurIPS 2018, Dec. 3-8, 2018, Montreal, Canada, pp. 7298-7309.
Yi, K., et al., 'Neural-Symbolic VQA: Disentangling Reasoning from Vision and Language Understanding,' In 32nd Conference on Neural Information Processing Systems, NeurIPS 2018, Montreal, Canada, 2018, 12 pages.
Yuan, L., et al., 'Cycle-SUM: Cycle-Consistent Adversarial LSTM Networks for Unsupervised Video Summarization,' Proceedings of the AAAI Conference on Artificial Intelligence 33, Jul. 17, 2019, pp. 9143-9150.
Zellers, R., et al., 'Defending Against Neural Fake News,' 33rd Conference on Neural Information Processing Systems, NeurIPS 2019, Vancouver, Canada, 2019, 12 pages.
Zhang, T., et al., 'BERTScore: Evaluating Text Generation With Bert,' ICLR 2020, 2020, 43 pages.
Zheng H., et al., 'Sentence Centrality Revisited for Unsupervised Summarization,' Proceedings of the 57th Annual Meeting of the Association for Computational Linguistics, Florence, Italy, Association for Computational Linguistics, Jul. 28-Aug. 2, 2019, pp. 6236-6347.
Liu, S., et al., 'Improved Image Captioning via Policy Gradient Optimization of SPIDEr,' 2017 IEEE International Conference on Computer Vision (ICCV), Venice, Oct. 2017, pp. 873-881.
Li, J., et al., 'Deep Reinforcement Learning for Dialogue Generation,' Proceedings of the 2016 Conference on Empirical Methods in Natural Language Processing, Austin, Texas, Association for Computational Linguistics, Nov. 1-5, 2016, pp. 1192-1202.
Elsahar, H., et al., "Zero-Shot Question Generation from Knowledge Graphs for Unseen Predicates and Entity Types," Proceedings of NAACL-HLT 2018, New Orleans, Louisiana, Jun. 1-6, 2018, pp. 218-228.
Extended European Search Report receive for European Patent Application No. 20305417.6 dated Oct. 28, 2020, 11 pages.
Amplayo, R., et al., "Unsupervised Opinion Summarization with Noising and Denoising," ARXIV.org, Cornell University Library, Ithaca, NY, 2020, 18 pages.
Karn, S., et al., "Generating Multi-Sentence Abstractive Summaries of Interleaved Texts," ARXIV.org, Cornell University Library, Ithaca, NY, 2019, 10 pages.
Yao, J., et al., "Recent advances in document summarization," Knowl Inf Syst 53, 2017, pp. 297-336.
Anderson, P., et al., 'Guided Open Vocabulary Image Captioning with Constrained Beam Search,' Proceedings of the 2017 Conference on Empirical Methods in Natural Language Processing, Copenhagen, Denmark, Association for Computational Linguistics, Sep. 7-11, 2017, pp. 936-945.
Angelidis, S., et al., 'Summarizing Opinions: Aspect Extraction Meets Sentiment Prediction and They Are Both Weakly Supervised,' Proceedings of the 2018 Conference on Empirical Methods in Natural Language Processing, Brussels, Belgium: Association for Computational Linguistics, Oct. 31-Nov. 4, 2018, pp. 3675-3686.
Artetxe, M., et al., 'Unsupervised Neural Machine Translation,' 6th International Conference on Learning Representations, ICLR 2018, Vancouver, BC, Canada, Apr. 30-May 3, 2018, Conference Track Proceedings, 12 pages . . . .
Barrios, F., et al., 'Variations of the Similarity Function of TextRank for Automated Summarization,' published on ArXiv.org as 1602.03606, Feb. 11, 2016, 8 pages.
Blei, D., 'Latent Dirichlet Allocation,' Journal of Machine Learning Research 3, 2003, pp. 993-1022.
Bražinskas, A., et al., 'Unsupervised Opinion Summarization as Copycat-Review Generation,' published on ArXiv.org as 1911.02247, Nov. 6, 2019, 19 pages.
Chen, Y., et al., 'A Stable and Effective Learning Strategy for Trainable Greedy Decoding,' Proceedings of the 2018 Conference on Empirical Methods in Natural Language Processing, Brussels, Belgium, Association for Computational Linguistics, Nov. 4, 2018, pp. 380-390.
Chu, E., et al., MeanSum: A neural model for unsupervised multi-document abstractive summarization, Proceedings of the 36th International Conference on Machine Learning, ICML 2019, Jun. 9-15, 2019, Long Beach, California, pp. 1223-1232.
Coavoux, M., et al., 'Unsupervised Aspect-Based Multi-Document Abstractive Summarization,' Proceedings of the 2nd Workshop on New Frontiers in Summarization, Hong Kong, China, Association for Computational Linguistics, Nov. 4, 2019, pp. 42-47.
Cohan, A., et al., 'A Discourse-Aware Attention Model for Abstractive Summarization of Long Documents,' published on ArXiv.org as 1804.05685, May 22, 2018, 7 pages.
Cortes, C., et al., 'Support-Vector Networks,' Machine Learning 20, No. 3, Sep. 1995, pp. 273-297.
Dathathri, S., et al., 'Plug and Play Language Models: A Simple Approach to Controlled Text Generation,' published on ArXiv.org as 1912.02164v2, Dec. 23, 2019, 34 pages.
Devlin, J., et al., 'BERT: Pre-Training of Deep Bidirectional Transformers for Language Understanding,' Proceedings of the 2019 Conference of the North American Chapter of the Association for Computational Linguistics: Human Language Technologies, vol. 1, Minneapolis, Minnesota, Jun. 2-7, 2019, pp. 4171-4186.

(56) References Cited

OTHER PUBLICATIONS

Drozdov, A., et al., 'Unsupervised Latent Tree Induction with Deep Inside-Outside Recursive Autoencoders,' published on ArXiv.org as 1904.02142, Apr. 4, 2019, 14 pages.

Elsahar, H., et al., 'Building Large Arabic Multi-Domain Resources for Sentiment Analysis,' Computational Linguistics and Intelligent Text Processing—16th International Conference, CICLing 2015, Cairo, Egypt, Apr. 14-20, 2015, Proceedings, Part II, pp. 23-34.

Erkan, G., et al., 'LexRank: Graph-Based Lexical Centrality as Salience in Text Summarization,' Journal of Artificial Intelligence Research 22, 2004, pp. 457-479.

Falke, T., et al., 'Ranking Generated Summaries by Correctness: An Interesting but Challenging Application for Natural Language Inference,' Proceedings of the 57th Annual Meeting of the Association for Computational Linguistics, Florence, Italy, Association for Computational Linguistics, Jul. 28-Aug. 2, 2019, pp. 2214-2220.

Fan, A., et al., 'Controllable Abstractive Summarization,' Published on ArXiv.org as 1711.05217, Nov. 14, 2017, 10 pages.

Fan, R., et al., 'Liblinear: A Library for Large Linear Classification,' Journal of Machine Learning Research 9, 2008, pp. 1871-1874.

Ganesan, K., et al., 'Opinosis: A Graph Based Approach to Abstractive Summarization of Highly Redundant Opinions,' Proceedings of the 23rd International Conference on Computational Linguistics, Aug. 2010, pp. 340-348.

Gholipour Ghalandari, D., 'Revisiting the Centroid-Based Method: A Strong Baseline for Multi-Document Summarization,' Proceedings of the Workshop on New Frontiers in Summarization, Copenhagen, Denmark, Association for Computational Linguistics, Sep. 7, 2017, pp. 85-90.

He, R., et al., 'An Unsupervised Neural Attention Model for Aspect Extraction,' Proceedings of the 55th Annual Meeting of the Association for Computational Linguistics (vol. 1: Long Papers), Vancouver, Canada, Association for Computational Linguistics, Aug. 4, 2017, pp. 388-397.

Hokamp, C., et al., 'Lexically Constrained Decoding for Sequence Generation Using Grid Beam Search,' Proceedings of the 55th Annual Meeting of the Association for Computational Linguistics (vol. 1: Long Papers), Vancouver, Canada, Jul. 30-Aug. 4, 2017, pp. 1535-1546.

Holtzman, A., et al., 'Learning to Write with Cooperative Discriminators,' Proceedings of the 56th Annual Meeting of the Association for Computational Linguistics (vol. 1: Long Papers), Melbourne, Australia, Association for Computational Linguistics, Jul. 15-20, 2018, pp. 1638-1649.

Jang, E., et al., 'Categorical Reparameterization With Gumbel-Softmax,' 5th International Conference on Learning Representations, ICLR 2017, Toulon, France, Apr. 24-26, 2017, 12 pages.

Junczys-Dowmunt, M., 'Microsoft Translator at WMT 2019: Towards Large-Scale Document-Level Neural Machine Translation,' Proceedings of the Fourth Conference on Machine Translation (vol. 2: Shared Task Papers, Day 1), Florence, Italy: Association for Computational Linguistics, Aug. 1-2, 2019, pp. 225-233.

Keskar, N., et al., 'CTRL: A Conditional Transformer Language Model for Controllable Generation,' Published on ArXiv.og as 1909.05858, Sep. 20, 2019, 18 pages.

Kryscinski, W., et al., 'Neural Text Summarization: A Critical Evaluation,' Proceedings of the 2019 Conference on Empirical Methods in Natural Language Processing and the 9th International Joint Conference on Natural Language Processing (EMNLP-IJCNLP), Hong Kong, China, Association for Computational Linguistics, Nov. 3-7, 2019, pp. 540-551.

Kudo, T., et al., 'SentencePiece: A Simple and Language Independent Subword Tokenizer and Detokenizer for Neural Text Processing,' Proceedings of the 2018 Conference on Empirical Methods in Natural Language Processing, System Demonstrations, Brussels, Belgium, Association for Computational Linguistics, Oct. 31-Nov. 4, 2018, pp. 66-71.

Lample, G., et al., 'Unsupervised Machine Translation Using Monolingual Corpora Only,' 6th International Conference on Learning Representations, ICLR 2018, Vancouver, BC, Canada, Apr. 30-May 3, 2018, Conference Track Proceedings, 2018, 14 pages.

Lewis, P., et al., 'Unsupervised Question Answering by Cloze Translation,' Unsupervised question answering by cloze translation, published on arXiv.org as 1906.04980v2, Jun. 27, 2019, 15 pages.

Li, J., et al., 'A Diversity-Promoting Objective Function for Neural Conversation Models,' Proceedings of the 2016 Conference of the North American Chapter of the Association for Computational Linguistics: Human Language Technologies, San Diego, California, Jun. 12-17, 2016, pp. 110-119.

Libovický, J., et al., 'Input Combination Strategies for Multi-Source Transformer Decoder,' Proceedings of the Third Conference on Machine Translation, Research Papers, Belgium, Brussels, Association for Computational Linguistics, Nov. 1, 2018, pp. 253-260.

Lin, C., 'Rouge: A Package for Automatic Evaluation of Summaries,' Text Summarization Branches Out, Barcelona, Spain, Association for Computational Linguistics, Jul. 2004, pp. 74-81.

Liu, Y., et al., 'Hierarchical Transformers for Multi-Document Summarization,' Proceedings of the 57th Annual Meeting of the Association for Computational Linguistics, Florence, Italy, Association for Computational Linguistics, Jul. 28-Aug. 2, 2019, pp. 5070-5081.

Luong, M., et al., 'Addressing the Rare Word Problem in Neural Machine Translation,' Proceedings of the 53rd Annual Meeting of the Association for Computational Linguistics and the 7th International Joint Conference on Natural Language Processing, vol. 1, Long Papers, Beijing, China, Association for Computational Linguistics, 2015, pp. 11-19.

Mihalcea, R., et al., 'TextRank: Bringing Order into Texts,' Proceedings of EMNLP 2004, Association for Computational Linguistics. Barcelona, Spain, Jul. 2004, pp. 404-411.

Nabil, M., et al., 'LABR: A Large Scale Arabic Sentiment Analysis Benchmark,' published on ArXiv.org as 1411.6718, Nov. 25, 2014.

Nayeem, M., et al., 'Abstractive Unsupervised Multi-Document Summarization Using Paraphrastic Sentence Fusion,' Proceedings of the 27th International Conference on Computational Linguistics, Association for Computational Linguistics Santa Fe, New Mexico, USA, Aug. 20-26, 2018, pp. 1191-1204.

Ng, A., 'Feature Selection, L1 vs. L2 Regularization, and Rotational Invariance,' Twenty-First International Conference on Machine Learning—ICML '04, Banff, Alberta, Canada, ACM Press, 2004, 8 pages.

Ott, M., et al., 'FAIRSEQ: A Fast, Extensible Toolkit for Sequence Modeling,' Proceedings of the 2019 Conference of the North, Minneapolis, Minnesota, Association for Computational Linguistics, Jun. 2-7, 2019, pp. 48-53.

Paszke, A., et al., 'PyTorch: An Imperative Style, High-Performance Deep Learning Library,' Advances in Neural Information Processing Systems 32, Curran Associates, Inc., 2019, pp. 8024-8035.

Pedregosa, F., et al., 'Scikit-Learn: Machine Learning in Python,' Machine learning in Python, Journal of Machine Learning Research, and Journal of machine learning research 12, 2011, pp. 2825-2830.

Peyrard, M., 'A Simple Theoretical Model of Importance for Summarization,' Proceedings of the 57th Annual Meeting of the Association for Computational Linguistics, Florence, Italy, Association for Computational Linguistics, Jul. 28-Aug. 2, 2019, pp. 1059-1073.

Post, M., et al., 'Fast Lexically Constrained Decoding with Dynamic Beam Allocation for Neural Machine Translation,' Proceedings of the 2018 Conference of the North American Chapter of the Association for Computational Linguistics: Human Language Technologies, vol. 1 (Long Papers), New Orleans, Louisiana, Association for Computational Linguistics, Jun. 1-6, 2018, pp. 1314-1324.

Radev, D., et al., 'Centroid-Based Summarization of multiple documents,' Information Processing & Management 40, No. 6, Nov. 2004, pp. 919-938.

\* cited by examiner

902 — This was my ▓▓▓ to ▓▓▓ and I really enjoyed it . I had the ▓▓▓ and my husband had ▓▓▓ . We both enjoyed our ▓▓▓ as well . The ▓▓▓ of the ▓▓▓, however, was not what we expected . We also enjoyed the ▓▓▓ as well as the ▓▓▓ which was not bad at all . This place is a bit on the expensive side for what you get, but you get what you pay for . The ▓▓▓ is limited, so it's a good place to visit if you're in a hurry.

904 — Drove by here for the ▓▓▓. I just went to the ▓▓ with a friend and it's a quick fix that is just about as good as it gets. But it's not an actual ▓▓▓, but it's not as good as I remembered it, but they were great!! ▓▓▓ was also very good, just a hint of cinnamon. I will be back for the other locations.

906 — Will not return This place is always good. I think the owner actually made my sandwich last time I was there . owner or manager, anyway it was superb! Ordered a sandwich, watched the guy write it down and 25 minutes later the same person asked what I wanted when I reminded him of my sandwich, he only said he can't remember where the order went. I watched 4 people come in after me order, one person the same sandwich just a different size then me get their food, pay and leave. At that point I gave up because as much as I like their sandwiches I am never going back.

FIG. 9

Correct Control Codes: ▇, ▇, ▇, ▇, remember, ▇, ▇

Seriously best we've had in Toronto. We were looking for a ▇ place to ▇ and stumbled upon this place. The atmosphere is very authentic, the food is authentic, and the service is very ▇ and attentive. We started with the ▇ soup, which was very ▇ and full of flavor. For dinner, I had the lamb shank and my husband had the ▇ dish. Both were very good. We also had the baklava for dessert and it was amazing. We can't wait to come back and try more of the menu

Correct Control Codes: ▇, ▇, ▇, ▇, ▇, ▇, ▇, ▇

Seriously best I've had in Toronto. We were looking for a place to ▇ and this was the first ▇ we went to. The ▇ was great and the ▇ were authentic, ▇ and authentic. We had the ▇ sampler and the ▇ sampler. Both dishes were amazing. We also had the baklava, which was also very good. I can't ▇ the name of the dish, but it was very authentic

Incorrect Control Codes: open, tortellini, filter, details, rabbit, signature, craving, double Seriously best I've had in Toronto. We were looking for a new place to try and stumbled upon Syrianian food. We came across this place on yelp and decided to give it a try. The food, the service, the atmosphere, the quality of the food, and the service were all amazing. We ordered the sampler platter for two and it was enough for two people to share. We also ordered the Brabianianian appetizer, which was one of the best we've ever had. For our main course, we ordered the Crabian Frabian Bianianca and the Bianca. Both were so authentic, and full of flavour. For dessert, we had the Turkish coffee which was also very good. The only thing I didn't like was the bread they give you .

Incorrect Control Codes: beer, balls, skip, mains, croissant, replacement, wish Seriously best I've had in Toronto. We came here with a friend and we were looking for a place to eat. We found Syrianian food, which was very authentic. We were very impressed with the quality of the food, the service, and the atmosphere. We had the sampler platter, which came with two ▇ and two ▇ for dinner. We also had the bread pudding for dessert and it was to die for. I'm not a huge fan of sweets, but this was one of the best we've ever had. I ▇ we lived in Toronto so we could come here all the time. We'll be back to try more of the menu .

FIG. 10

ABSTRACTIVE MULTI-DOCUMENT SUMMARIZATION THROUGH SELF-SUPERVISION AND CONTROL

PRIORITY CLAIM AND REFERENCE TO RELATED APPLICATION

This application claims priority to European Patent Office Application No. EP20305417.6, filed Apr. 30, 2020, which application is incorporated herein by reference in its entirety.

FIELD

The present disclosure relates generally to natural language processing using machine learning, and more particularly to methods and systems for generating enriched training data for a multi-source transformer neural network for generation of a summary of one of one or more passages of input text.

BACKGROUND

Recently, unsupervised methods, relying on a bootstrapping approach of iteratively alternating between two representations and optimizing a reconstructional loss, have led to breakthroughs in natural language processing applications such as machine translation (Artetxe et al, "*Unsupervised neural machine translation*", in 6th International Conference on Learning Representations, ICLR 2018; Lample et al, "*Unsupervised machine translation using monolingual corpora only*", in ICLR 2018 Conference Track Proceedings). A similar approach has been applied to video summarization (Yuan et al, "*Cyclesum: cycle-consistent adversarial LSTM networks for unsupervised video summarization*", in Proceedings of the AAAI Conference on Artificial Intelligence, Volume 33, pp. 9143-9150, 2019).

Unsupervised approaches of the prior art for summarization of text have relied mostly on extractive graph-based systems (e.g., Mihalcea and Tarau, "*TextRank: Bringing order into text*", in Proceedings of EMNLP 2004, pp. 404-411, 2004). Graph-based abstractive methods (e.g., as disclosed in Ganesan et al. "*Opinosis: A graph based approach to abstractive summarization of highly redundant opinions*", in Proceedings of the 23rd International Conference on Computational Linguistics 2010, pp. 340-348; Nayeem et al. "*Abstractive unsupervised multi-document summarization using paraphrastic sentence fusion*", in Proceedings of the 27th International Conference on Computational Linguistics, pp. 1191-1204) construct graphs whose nodes are the sentences from the input document and whose edges indicate a high word overlap between two sentences. A summary of an input document can be formed by finding salient paths in this type of graph such as by employing the PageRank algorithm.

Abstractive methods for summarization, in contrast, involve generating new words and sentences that do not occur in the input document. Recently, methods for unsupervised abstractive summarization using autoencoders have been proposed in Bražinskas et al, "*Multi-Document Opinion Summarization as Copycat-Review Generation*", arXiv: 1911.02247, 2019. This approach, however, requires a complex combination of loss functions or hierarchical latent variables to ensure that the generated summaries remain within the topic of the text to be summarized.

Unsupervised methods for abstractive summarization have been proposed in Chu and Liu, "*Meansum: A neural model for unsupervised multi-document abstractive summarization*", in Proceedings of the 36th International Conference on Machine Learning, ICML 2019, which employ a review autoencoder. According to this approach, every input document for a topic is encoded in a vector and the centroid of the vectors is employed to seed a decoder to generate a summary. However, averaging representations of input documents, that are sometimes contradictory, leads to the generation of "hallucinations" as output.

To overcome the latter problem, Coavoux et al, "*Unsupervised aspect-based multi-document abstractive summarization*", in Proceedings of the 2nd Workshop on New Frontiers in Summarization, pp. 42-47, 2019 proposed to add a clustering to identify similar input documents and to generate one sentence per cluster, so that the averaging only targets similar input documents, overcoming the problem of the decoder hallucinations.

Another approach to overcome the problem of hallucinations that has been investigated is the application of global constraints on text generation. According to methods discussed in the literature, policy gradient methods such as Reinforce (Williams, "*Simple statistical gradient-following algorithms for connectionist reinforcement learning*", Machine Learning, 8(3-4):229-256, 1992) have been applied to numerous applications. In other approaches, control is applied only at inference time using weighted decoding (Holtzman et al, "*Learning to write with cooperative discriminators*", in Proceedings of the 56th Annual Meeting of the Association for Computational Linguistics, Volume 1, pp. 1638-1649), which however was shown to be challenging and implying low fluency and coherence.

Control codes in neural generation models have been implemented to steer largescale language models towards desired traits (Keskar et al. "CTRL: *A conditional transformer language model for controllable generation*", CoRR abs/1909.05858. 2019). These approaches however rely on a predefined set of bags of control tokens collected manually or from dictionaries, which implies low domain coverage.

SUMMARY

Provided herein are methods and systems of self-supervised generation of enriched training data for a deep learning system such as a multi-source transformer neural network for multi-document summarization summarizing input text. In some embodiments, the enriched training data are employed to train a multi-input transformer neural network. The trained multi-input transformer neural network can then be used to generate one or more summaries of input text passages. The disclosed method involves generating control codes to ensure that the output reflects the input signal and thereby avoid "hallucinations".

In embodiments, a method of generating enriched training data for multi-document summarization using a processor is described, comprising creating, from a plurality of input text sets, training points each comprising an input text subset of the input text set and a corresponding reference input text from the input text set, wherein creating the training points comprises providing a similarity between the reference input text and the input text subset, wherein the size of the subset is a predetermined number. Creating the training points may comprise selecting the input text subset and the corresponding reference input text such that the input text subset and the corresponding reference input text achieve a maximum similarity measure.

According to an aspect, the creating of training points may be self-supervised.

According to an aspect, the method may further comprise training a plurality of processor-based classifiers for a plurality of categorical labels, each classifier classifying whether an input text falls under a categorical label from the plurality of categorical labels.

According to an aspect, the method may comprise collecting, for each training point, weights for reference features from the plurality of trained classifiers, comprising selecting the reference features from the trained classifiers corresponding to categorical labels of the respective reference input text, and selecting, for each input text in the subsets of the training point, based on the weights for the reference features, control codes from the reference features and enriching the input text with the selected control codes to generate enriched training data. In embodiments, the method may in particular comprise collecting, for each training point, features of the trained classifiers corresponding to categorical labels of the respective reference input text and weights associated with the features, selecting, for each input text in the input text subsets of the training points, based on the collected weights and associated features, control codes from the features and enriching the input text with the selected control code to generate enriched training data.

According to an aspect, the method may further comprise training a multi-source transformer neural network with the enriched training data, the multi-source transformer neural network being implemented using a processor and comprising an encoder pipeline of multi-input encoder layers and a corresponding decoder pipeline of cross-attention decoder layers, wherein a number of encoders comprised in each of the encoder layers corresponds to the predetermined number, said multi-source transformer neural network adapted to generate a summary of input text when the input text is not in the plurality of input text sets. According to an aspect, enriching the input text with the selected control code may comprise providing the respective control codes to each cross-attention decoder layer of the multi-source transformer neural network to restrain an output of the cross-attention decoder layer.

According to an aspect, training the multi-source transformer neural network with the enriched training data may comprise feeding each of the encoders of a first encoder layer of the encoder pipeline with the enriched input text from the subsets.

According to an aspect, a method for generating a summary of passages of input text may comprise receiving the passages of input text by a trained multi-source transformer neural network according to any of the above; determining a set of repeated control codes from the received plurality of input texts; providing the determined set of repeated control codes as a prefix to the decoder pipeline of the trained multi-source transformer neural network; and generating, using the decoder pipeline, the summary of the passages of input text.

According to an aspect, the passages of input text may be absent from the plurality of input text sets.

According to an aspect, each of the passages of input text may reflect opinions of a product or service offered by an entity.

According to an aspect, the method may further comprise transmitting, in response to a request, the generated summary of the passages of input text for display on a display.

According to an aspect, the trained multi-source transformer neural network may be provided on a server, the request may be received from a client, and the summary may be transmitted to the client for display on a display of a client device in response to the request.

According to an aspect, selecting the control codes for each input text in the subsets of the training point may comprise selecting a predetermined number of highest weighted reference features that correspond to words in the corresponding reference input text.

According to an aspect, training the plurality of classifiers may comprise employing meta-data annotations of the input texts as categorical labels, and may also comprise employing a determined polarity of the input text.

According to an aspect, providing the similarity between the reference input texts and the corresponding subset of the input text may comprise, for each input text, selecting the input text subset to achieve a maximum similarity between the reference input text and the input text subset. The similarity may be determined as a sum of similarity measures between the reference input text and each of the input texts in the input text subset.

According to an aspect, providing a similarity between the reference input texts and the corresponding subset of the input text further may comprise ranking pairs of input texts and corresponding subsets by the similarity between the respective input text and the respective corresponding set of input texts and choosing a predetermined number of highest-ranking pairs as the training points. According to an aspect, optimizing the similarity between the reference input texts and the corresponding subset comprises employing a nearest neighbor search algorithm.

According to an aspect, training the plurality of classifiers for a plurality of categorical labels may comprise training each of one or more linear support vector machines for classifying whether an input text falls under one of the categorical labels.

According to an aspect, training the plurality of classifiers may comprise selecting the features of the classifier as the number of all unigrams and bigrams in the set of input texts.

According to an aspect, training the multi-source transformer neural network with the training data may comprise calculating averages of keys and averages of values of each of the encoders and configuring a multi-head attention network to attend to a set of decoder queries and to the averages of keys and the averages of values.

In embodiments, a method of generating enriched training data for multi-document summarization using a processor is provided, comprising creating, from a plurality of input text sets, training points each comprising an input text subset of the input text set and a corresponding reference input text from the input text set, wherein creating the training points comprises providing a similarity between the reference input text and the input text subset, wherein the size of the input text subset is a predetermined number. Creating the training points may comprise selecting the input text subset and the corresponding reference input text such that the input text subset and the corresponding reference input text achieve a maximum similarity measure. For each created training point, generating control codes may comprise selecting one or more reference features corresponding to categorical labels of the respective reference input text and selecting, for each input text in the input text subsets of the training points, control codes from the selected reference features. The input texts in the input text subsets of the training points are enriched with the generated control codes to generate enriched training data.

According to an aspect, the creating of training points is self-supervised.

According to an aspect, the method may further comprise training a multi-source transformer neural network with the enriched training data, the multi-source transformer neural network being implemented using a processor and comprising an encoder pipeline of multi-input encoder layers and a corresponding decoder pipeline of cross-attention decoder layers, wherein a number of encoders comprised in each of the encoder layers corresponds to the predetermined number, said multi-source transformer neural network adapted to generate a summary of input text when the input text is not in the plurality of input text sets. According to an aspect, enriching the input text with the selected control code may comprise providing the respective control codes to each cross-attention decoder layer of the multi-source transformer neural network to restrain an output of the cross-attention decoder layer.

According to an aspect, training the multi-source transformer neural network with the enriched training data may comprise feeding each of the encoders of a first encoder layer of the encoder pipeline with the enriched input text from the subsets.

According to an aspect, a method for generating a summary of passages of input text comprises receiving the passages of input text by a trained multi-source transformer neural network according to any of the above; determining a set of repeated control codes from the received plurality of input texts; providing the determined set of repeated control codes as a prefix to the decoder pipeline of the trained multi-source transformer neural network; and generating, using the decoder pipeline, the summary of the passages of input text.

According to an aspect, the passages of input text are not in the plurality of input text sets.

According to an aspect, each of the passages of input text reflect opinions of a product or service offered by an entity.

In embodiments, a machine-learning system implemented using a processor for generating enriched training data for a multi-source transformer neural network for multi-document summarization summarizing input text is disclosed. The system comprises a relevance analysis module configured to create, from an input text set, training points comprising a reference input text from the input text set and an input text subset of the input text set, wherein creating the training point comprises selecting an input texts as reference input text and optimizing the corresponding subset achieving a maximum similarity, a plurality of classifiers for classifying whether an input text falls under a categorical label, and means for collecting, for each training point, weighted reference feature weights from the plurality of classifiers, wherein the reference features are selected from classifiers corresponding to categorical labels of the respective reference input text. The system further comprises means for selecting, for each input text in the subsets of the training point, control codes from the reference features and enriching each input text with the respectively selected control code to generate enriched training data.

In an aspect, the system may comprise means for collecting, for each training point, features of the trained classifiers corresponding to categorical labels of the respective reference input text and weights associated with the features, and for selecting, for each input text in the input text subsets of the training points, based on the collected weights and associated features, control codes from the features and for enriching the each input text with the respectively selected control code to generate enriched training data.

In an aspect, the system may further comprise the multi-source transformer neural network adapted to generate a summary of input text when the input text is not in the plurality of input text sets, the multi-source transformer neural network comprising an encoder pipeline of multi-input encoder layers and a corresponding decoder pipeline of cross-attention decoder layers, wherein each cross-attention decoder layer comprises a multi-input multi-head attention network, wherein a number of encoders comprised in each of the encoder layers corresponds to a predetermined number.

According to an aspect, the multi-source multi-head attention network may comprise a plurality of multi-head attention network corresponding to the predetermined number, wherein each multi-head attention network is configured to receive keys and values from one of the encoders of the last multi-input encoder layer.

According to an alternative aspect, the multi-source multi-head attention network may comprise an averaging component and a multi-head attention network, wherein the averaging component is configured to calculate averages of keys and averages of values, the keys and values respectively provided by the encoders of the last multi-input encoder layer, and wherein the multi-head attention network is configured to attend to a set of decoder queries and to the average of keys and the average of values provided by the averaging component.

According to a complementary aspect, the present disclosure provides a computer program product, comprising code instructions to execute a method according to the previously described aspects; and a computer-readable medium, on which is stored a computer program product comprising code instructions for executing a method according to the previously described embodiments and aspects. The present disclosure further provides a processor configured using code instructions for executing a method according to the previously described embodiments and aspects.

Other features and advantages of the invention will be apparent from the following specification taken in conjunction with the following drawings.

DESCRIPTION OF THE DRAWINGS

The accompanying drawings are incorporated into the specification for the purpose of explaining the principles of the embodiments. The drawings are not to be construed as limiting the invention to only the illustrated and described embodiments or to how they can be made and used. Further features and advantages will become apparent from the following and, more particularly, from the description of the embodiments as illustrated in the accompanying drawings, wherein:

FIG. 9 reproduces texts of summaries generated by systems of the prior art and by the here disclosed system;

FIG. 10 reproduces texts of summaries generated by the disclosed system employing correct or incorrect control codes.

In the drawings, reference numbers may be reused to identify similar and/or identical elements.

DETAILED DESCRIPTION

Methods and systems are provided for training a deep learning system (e.g., a multi-source transformer neural network) for generation of a summary of one or more passages of input text relating to a subject matter (e.g., an entity). For example, the input texts can be reviews or user comments for a service offered by an entity at a venue such as a hotel or a product offered for sale or lease by an entity. For purposes of explanation, examples and specific details are set forth in order to provide a thorough understanding of the embodiments. Embodiments, as defined by the claims, may include some or all of the features in these examples alone or in combination with the other features described below, and may further include modifications and the equivalence of the features and concepts described herein. The following description will refer to FIGS. 1 to 11, explaining embodiments and technical advantages in detail.

Figure 1:
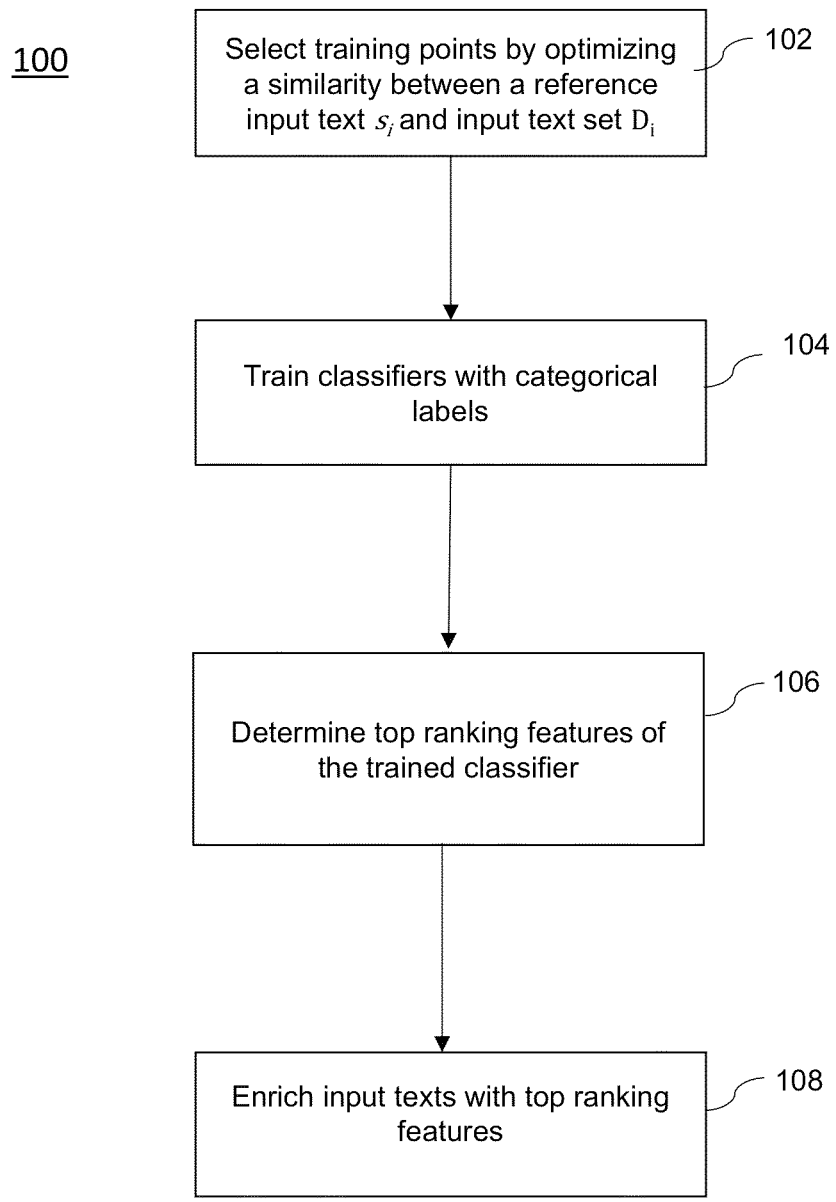
FIG. 1 is a flow diagram of a method for self-supervised generation of enriched training data from a plurality of input text sets.

FIG. 1 illustrates a method 100 for generating a training data set that may be employed to train a processor-based machine-learning system (i.e., a deep-learning system) to generate summaries of a set of one or more input texts. In embodiments, the trained machine-learning system may then be employed to generate a summary of a passage (e.g., a set of user comments or opinions on a product), as described below with reference to FIG. 3. The disclosed training approach is based on self-supervision and does not require manual intervention to define a reference summary.

Method 100 employs a plurality of input text sets $\{\mathcal{D}_1 \ldots \mathcal{D}_n\}$, where each input text set $\mathcal{D}_i$ is a collection of input texts relating to a same subject-matter, e.g., a particular venue or product of an entity. Method 100 comprises generating artificial examples by providing input texts (such as but not limited to reviews or opinions) from $\mathcal{D}_i$ that will act as target summaries $s_i$ and corresponding subsets $D_i$ of the input texts $\mathcal{D}_i$ of the same entity labelled with i. To limit the number of possible combinations of selecting $D_i$ and $s_i$, the size of $D_i$ may be fixed to be a predetermined number k so that the method is focused on finding k good input texts $D_i$ for which $s_i$ is a good summary such that a relevancy measure or a similarity measure between $D_i$ and $s_i$ is maximized.

In embodiments, the relevancy between $D_i$ and $s_i$ is measured according to the model of importance in summarization of Peyrard, "*A Simple Theoretical Model of Importance for Summarization*", in Proceedings of the 57th Annual Meeting of the Association for Computational Linguistics, pages 1059-1073, 2019, which is hereby incorporated by reference in its entirety. According to this example approach, the importance of a summary is based on the aspects of minimum redundancy, maximum relevance with the input document, and maximum informativeness. In the example disclosed approach, the focus is on finding a relevant set of reviews $D_i$ for a summary $s_i$.

Accordingly, step 102 comprises selecting a set $\mathrm{rel}(d_i) = \{d_{i_1}, d_{i_2}, \ldots, d_{i_k}\}$ as a subset of $D_i$ of size m that maximizes the mutual similarity between $s_i$ and the set $\mathrm{rel}(d_i)$ according to $$\mathrm{rel}(d_i) = \mathrm{argmax}_{S_i \subset \mathcal{D}_{v'}, |S_i|=k} \Sigma_{d_j \in S_i} \mathrm{sim}(d_i, d_j), \tag{1}$$

where sim is a measure for similarity between two texts. The generated data points $d_i$, rel $(d_i)$ are then sorted according to the value of their mutual similarity $$r_i = \Sigma_{d_j \in \mathrm{rel}(d_i)} \mathrm{sim}(d_i, d_j). \tag{2}$$

Then, a predetermined number T of highest-ranking pairs are selected to be further processed as explained below to create training points $(D_i, s_i)$. By limiting the number T of pairs for training, informativeness is increased, because creation of training points where input texts and target output text are repetitive is reduced. For example, in reviews of a movie, the statement "great movie" may be used repetitively but has limited informative value.

In embodiments, method step 102, which provides for a simple self-supervised solution of generating training points $(D_i, s_i)$, may be implemented efficiently using state-of-the-art nearest neighbor search libraries as, e.g., available from Python Scikit. In embodiments, the measure sim in Equations (1) and (2) can be chosen as the cosine similarity over a term frequency-inverse document frequency (TF-IDF) bag-of-word representation of the input texts.

In example embodiments, method 100 further comprises steps 104-108 for processing the training points to alleviate the problem of hallucinations. Hallucinations are pieces of generated text in summaries that bear no relationship to the text they were conditioned on. This may be caused by the training data containing a variety of contradictory signals or containing an excessive signal such as when a great number of input texts contain a similar statement such as "great movie". The problem of hallucinations is exacerbated in approaches of the prior art that are self-supervised such as the approach described in method step 102 above.

Example approaches provided herein employ control codes. Example control codes are categorical tokens that represent desired traits of the output text to steer the generated text towards more input coherent summaries. The disclosed approach relies on control codes inferred from metadata that are associated with each input text. These control codes can be used as prompts at inference time.

In some embodiments categorical metadata that represent the type of the entity the input text refers to, such as "Deli", "Beauty&Spa", "Furniture store", are employed. Control codes based on categories (e.g., based on categorical metadata) are referred to herein as categorical tokens (which tokens may include one or more categories). When, however, none of the input texts have metadata labels, as is the case in the Rotten Tomatoes data set employed for demonstrating the capabilities of the disclosed approach as described herein, or the provided metadata labels are insufficient, a subset of labelled examples may be employed. Categorical tokens are then inferred by a trained classifier that has been trained employing the labelled examples.

Other embodiments additionally employ metadata that represent a polarity of the input text. The polarity is a numerical value representing an average sentiment score of the input text. The disclosed approach relies on inferring control codes that naturally occur in the input texts and represent informative aspects that occur therein. As shown e.g., by Ng. "*Feature selection, L1 vs. L2 regularization, and rotational invariance*", in Proceedings of the 21$^{st}$ international conference on Machine learning, pp. 78, 2004, regularized classification models have intrinsic feature selection properties that have proven to generate relevant lexicons.

Method 100 comprises training 104 a regularized linear classification model for each categorical token. The regularized linear classification model is trained with input texts having a given categorical token and negative examples sampled randomly from the rest of the input texts.

In embodiments, the regularized linear classification model may comprise regularized linear classification models trained to classify a type of the entity the input text relates to and regularized linear classification models trained to classify a polarity of the input text.

In an embodiment, the regularized linear classification model is a linear support vector machine (SVM) classifier implemented by a processor. The features of the SVMs are parameterized by the weight vector $\theta_i \in \mathbb{R}^d$, wherein d is the number of features.

In embodiments, the features correspond to all unigrams and bigrams present in the plurality of input text sets, though other n-grams could be used. In embodiments, a squared hinge loss with L1 regularization over $\theta_i$ is employed to increase sparsity and force feature selection. The thereby-obtained list is then trimmed to those features which correspond to positive weights and processed by renormalizing the weights.

The process of training a regularized linear classification model and selecting features to obtain a ranked list of features, is repeated for all categories defined by the categorical tokens.

In method step 106, for each training point, reference features that represents distinctive aspects of the given category corresponding to the categorical token are selected from the features of the trained regularized linear classification model. The reference features may be top-ranking words yielded from the classifiers corresponding to all categorical labels for the entity the input texts refer to. Here, the labels of the entity correspond to the categorical labels of the reference summaries $s_i$. Method step 106 involves collecting the features of the classifiers corresponding to the categorical labels of $s_i$. Method step 106 may involve considering only these features that occur in the reference input text $s_i$ and selecting among these features the features with highest weight as a set of reference features.

Method 100 further comprises step 108 of enriching each of the input texts in the input text subsets $D_i$ of the training points with tailored control codes from top-ranking words yielded from the classifiers corresponding to the entity to generate enriched training data. The enriched training data can be used in example training methods as disclosed herein, output, and/or stored in any suitable memory (including random access memory, internal or external storage, etc.) for later use.

Figure 2:
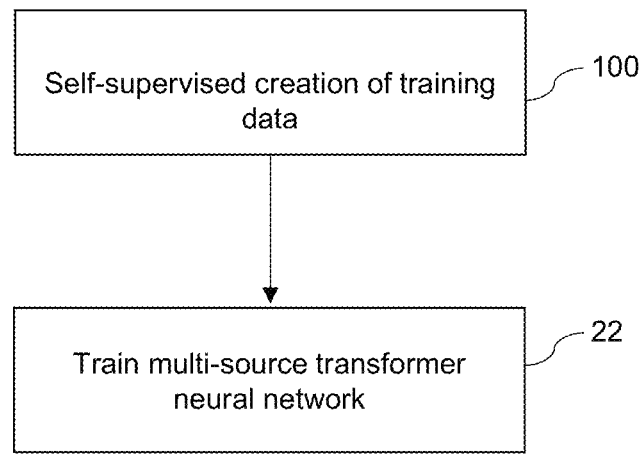
FIG. 2 shows a flow diagram of a method for training a multi-source transformer neural network.

FIG. 2 illustrates a method for training a multi-sourced transformer neural network. Method 20 comprises creating 100 enriched training data according to the self-supervised approach, as described with reference to FIG. 1. If enriched training data has already been generated for use in the method 20 (e.g., previously generated and stored enriched training data), this step may be omitted.

Method 20 then comprises training 22 a multi-source transformer neural network employing the enriched training data, including the training points ($D_i$, $s_i$), wherein the multi-source transformer neural network processes in parallel the input texts comprised in $D_i$ and is trained by setting the reference summary $s_i$ as a target. The multi-source transformer neural network employed will be described in detail with reference to FIGS. 5 to 8 below. The training of the multi-source transformer neural network may rely on minimizing a log-likelihood loss with teacher forcing.

Employing the enriched training data to train 22 the multi-source transformer neural network may comprise providing the respective control codes to each cross-attention decoder layer of the multi-source transformer neural network to restrain an output of the cross-attention decoder layer.

Figure 3:
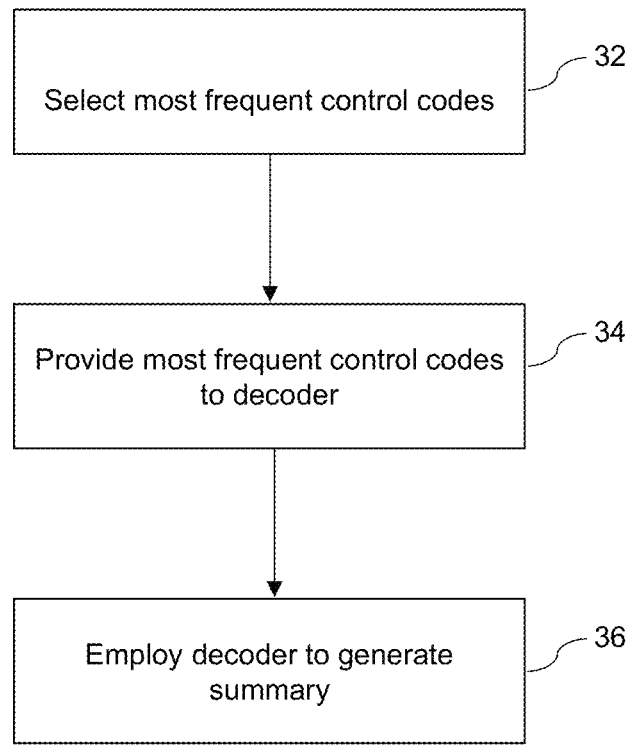
FIG. 3 illustrates a flow diagram of a method employing a trained multi-source transformer neural network to generate a summary of a plurality of input texts.

FIG. 3 illustrates method steps of generating a summary of input texts at inference time. The trained machine-learning system is configured to extract a short summary of multiple input texts (i.e., passages) that may, for example, reflect multiple opinions of humans on a product or service offered by an entity, such as but not limited to a car, a hotel, a movie, etc.

In method step 32, the most repeated control codes from the input side (for example, the most repeated 2, 3, 4, 5, 6, 7, 8, 9, 10, or other selected number of control codes) are determined by determining the control codes used for training and their frequency of usage.

In method step 34, the determined frequent control codes are provided as a prefix to the decoder of the trained multi-source transformer neural network. In method step 36, the trained decoder of the multi-source transformer neural network generates a summary from the input texts.

Figure 4:
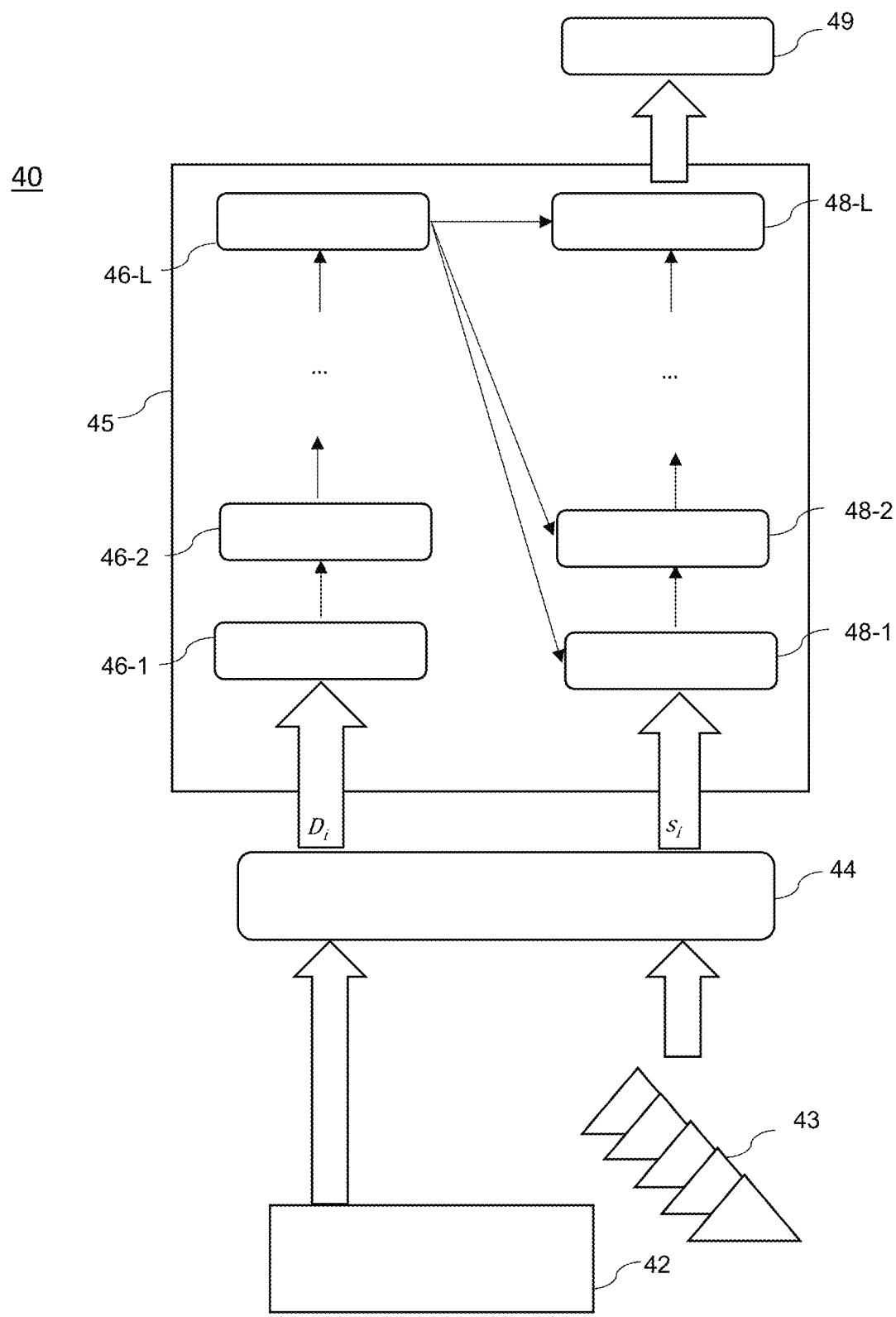
FIG. 4 illustrates a block diagram of components employed for self-supervised generation of enriched training data from a set of input texts and for training a multi-source transformer neural network with the enriched generated training data.

FIG. 4 illustrates a block diagram of a system 40 for training a machine-learning system for multi-document summarization. System 40 comprises a relevance analysis module 42 that is configured to create training points of a reference input text and a maximally relevant subset of input texts, rank the pairs, and select pairs with highest mutual relevancy, as described above with reference to step 102 of FIG. 1.

System 40 further comprises regularized linear classification models 43 such as SVMs that are trained for classifying whether an input text belongs to a category defined by a categorical token of the corresponding reference input, as described with reference to step 104 of FIG. 1.

Processing block 44 is configured to enrich the input texts with control codes selected from the corresponding classifiers, as described with reference to steps 106 to 108 of FIG. 1 to generate enriched training data.

The enriched training points are processed by multi-source transformer neural network 45. Multi-source transformer model 45 comprises an encoder pipeline of L multi-input encoder layers 46-1, 46-2, ..., 46-L, and a decoder pipeline of L cross-attention decoder layers 48-1, ..., 48-L. The first encoder layer 46-1 receives input of the multiple sources such as the subset of input texts $D_i$ during training. Each layer of multi-input encoder 46-i passes its output to the following layer 46-(i+1), up to the highest multi-input encoder layer 46-L. In example embodiments, L=6 is chosen, though this number can be greater or smaller (e.g., 2, 3, 4, 5, 7, 8, 9, 10, 10+).

The top-most multi-input encoder layer 46-L is configured to provide its output to all layers of decoder pipeline 48-1, 48-2, ..., 48-L. The lowest decoder layer 48-1 receives input of the reference input texts $s_i$ that form a training point with a corresponding input text set $D_i$ fed to multi-input encoder layer 46-1. When inputting $s_i$ to decoder layer 48-1, $s_i$ is right-shifted, so that multi-source transformer neural network 45 is trained in a teacher-forcing mode. Output of the top-most decoder layer 48-L is processed by a linear and softmax processing block 49 to produce output probabilities.

Each cross-attention decoder layer 48-i may be configured to employ the control codes of the enriched training data to train 22 as restraints for the output of the cross-attention decoder layer.

Figure 5:
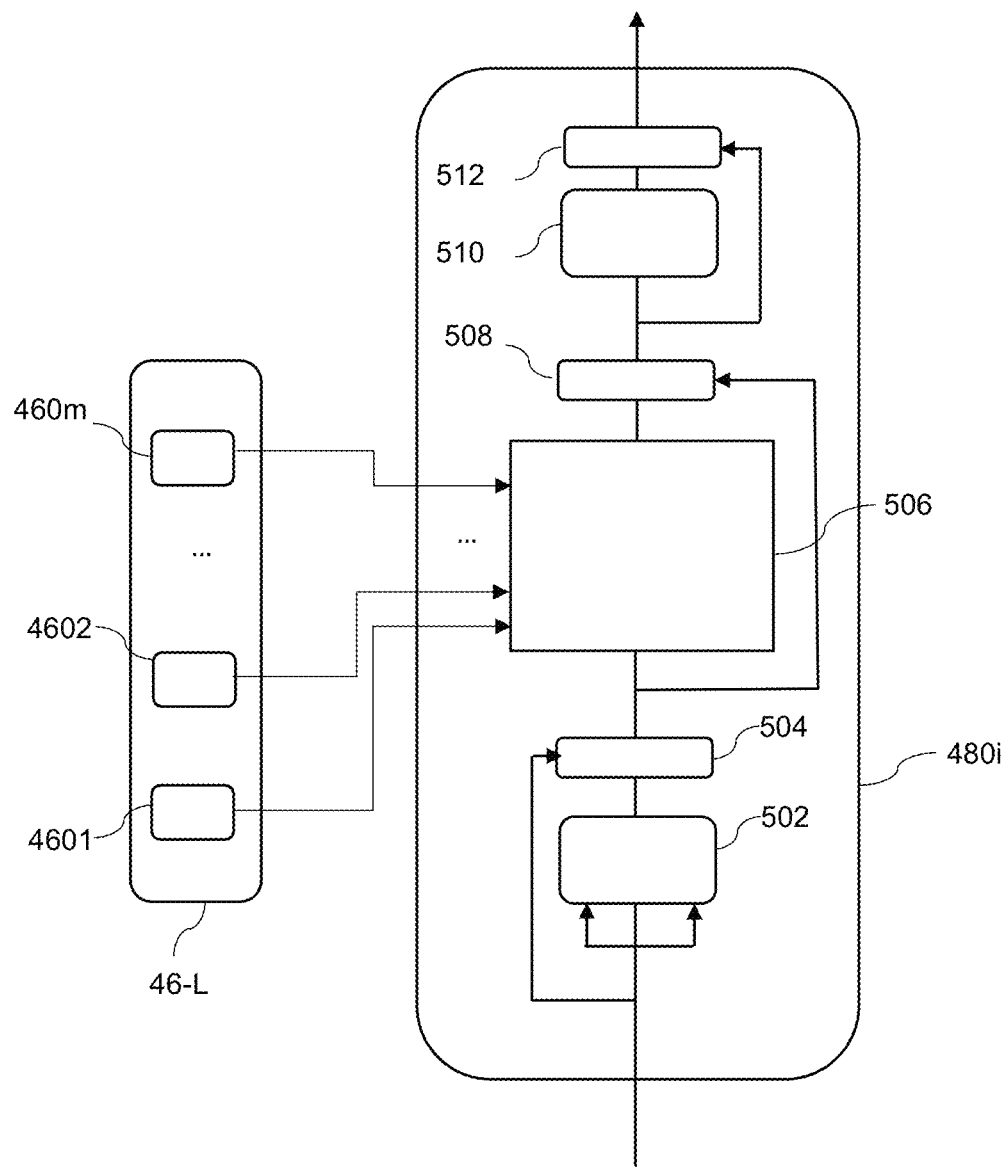
FIG. 5 shows a block diagram of multi-input encoder layers and cross-attention decoder layers of a multi-source transformer neural network.

FIG. 5 illustrates the interaction of components of multi-source encoder layer 46-L and any of the cross-attention decoder layers 48-1 to 48-L. This architecture generalizes the transformer architecture of Vaswani et al, "*Attention Is All You Need*", 31st Conference on Neural Information Processing Systems, 2017, which is hereby incorporated by reference in its entirety.

As illustrated in FIG. 5, each cross-attention decoder layer 480i processes its input by masked multi-head attention 502, which also receives direct input from the input of the previous decoder layer. Then, signals are processed by multi-head attention network 506 which also receives m outputs of encoders 4601, 4602, . . . 460m comprised in multi-input encoder layer 46-L. Outputs of encoders 4601, 4602, . . . 460m correspond to the m input texts in $D_i$, after subsequent processing by multi-input encoders 46-1, 46-2, . . . 46-L. Output of multi-head attention network 506 is processed by an add and norm block 508, which outputs to feedforward network 510 which is again followed by an add and norm block 512.

Figure 6:
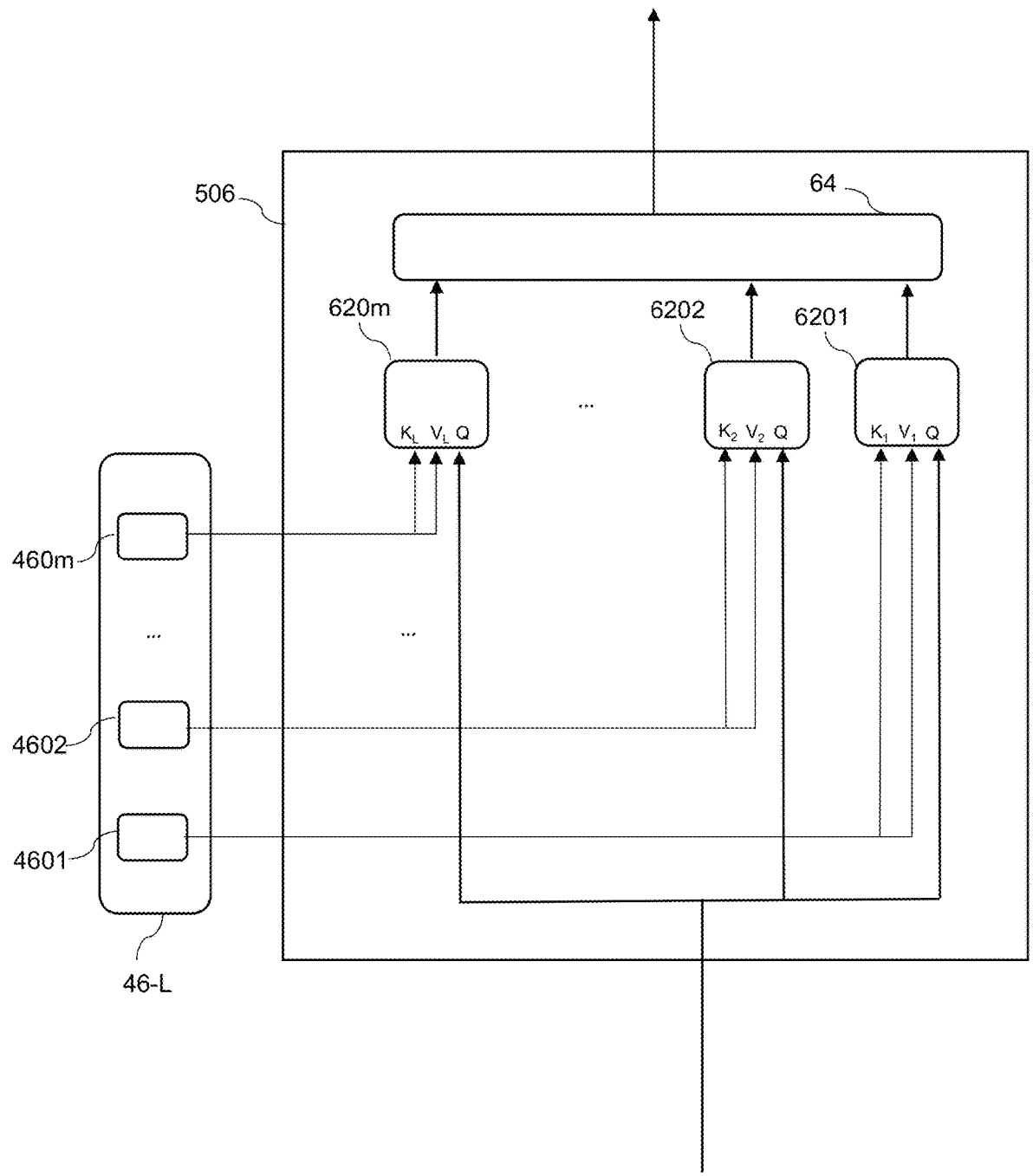
FIG. 6 shows a block diagram of a multi-source cross-attention network for parallel combination of multiple encoder output.

FIG. 6 illustrates an embodiment of a multi-source multi-head attention network 506 that comprises a plurality of multi-head attention networks 6201, . . . , 620m, where the plurality of multi-head attention networks 6201, . . . 620m corresponds to the plurality of encoders 4601, . . . , 460m. This embodiment is similar to the generalization of the Transformer model discussed in Libovický, Helcl and Mareček, "*Input Combination Strategies for a Multi-Source Transformer Decoder*", in Proceedings of the $3^{rd}$ Conference on Machine Translation: research papers, WMT2018, pages 253 to 260, which is hereby incorporated by reference in its entirety.

In the embodiment of FIG. 6, outputs of the plurality of encoders 4601, . . . , 460m are processed in parallel by the corresponding multi-head attention network 6201, 6202, . . . , 620m to produce a context between the inputs from the decoder pipeline and the encoder outputs. Each of the multi-head attention networks 6201, 6202, . . . , 620m comprises a number of heads that process in parallel the projections $K_i$ and $V_i$ of the output of the corresponding encoder 460i and a projection Q of the signal of the decoder pipeline. Projection Q of the signal of the decoder pipeline corresponds to signals passed from the previous decoder, or, for decoder 48-0, from input to the decoder pipeline.

As described in Vaswani et al., the projections are defined by learned parameter matrixes. Each of the parallel attention heads processes a reduced dimension of the size of the model. In embodiments the number of heads is 16, and the dimensions of $K_i$, $V_i$, $$Q \text{ is } \frac{d_{model}}{16}.$$

According to the embodiment of FIG. 6, the outputs of the attention multi-heads 6201, 6202, . . . , 620m are averaged by averaging block 64. Accordingly, the processing, according to the embodiment of FIG. 6, corresponds to evaluating $$A^h_{parallel}(Q, K_{1:m}, V_{1:m}) = \frac{1}{m}\sum_{i=1}^{m} A^h(Q, K_i, V_i), \quad (3)$$

where $A^h$ represents the attention MultiHead as disclosed in Vaswani et al. Hence, in the embodiment of FIG. 6, the decoder set of queries Q attends to each of the encoded inputs $K_i$, $V_i$ separately.

Figure 7:
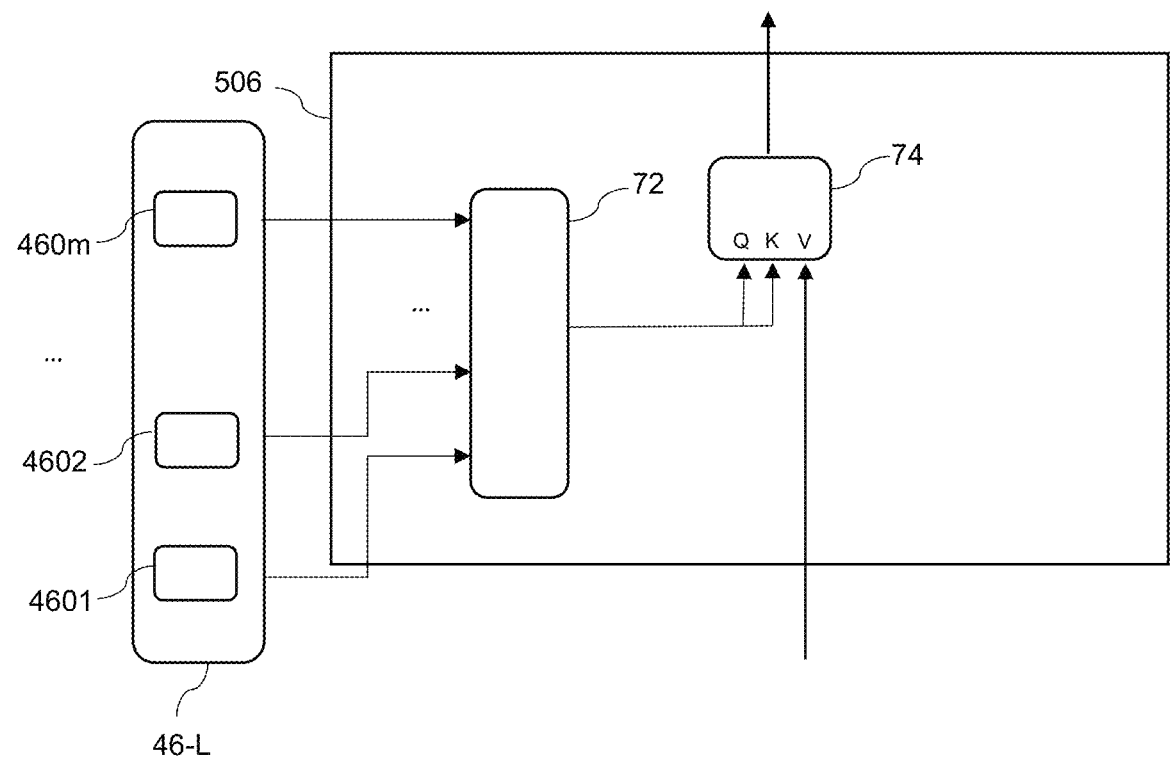
FIG. 7 shows a block diagram of a multi-source cross-attention network for mean combination of multiple encoder output.

FIG. 7 illustrates a block diagram of another embodiment of the multi-head attention network 506. In this embodiment, output of all encoders 4601, . . . , 460m is averaged by averaging component 72 before applying the attention mechanism 74. In this approach, the set of keys $K_i$ and values $V_i$ coming from each input encoder 460i are aggregated using an average at each absolute position. Afterwards, the decoder set of queries attend to this aggregated set of keys and values. Accordingly, instead of Equation 3, the multi-head attention network, according to the embodiment of FIG. 7, corresponds to $$A^h_{mean}(Q, K_{1:m}, V_{1:m}) = A^h\left(Q, \frac{1}{m}\sum_{i=1}^{m} K_i, \frac{1}{m}\sum_{i=1}^{m} V_i\right) \quad (4)$$

Hence, according to the embodiment of FIG. 7, the decoder set of queries Q attend to this aggregated set of keys and values.

Figure 8:
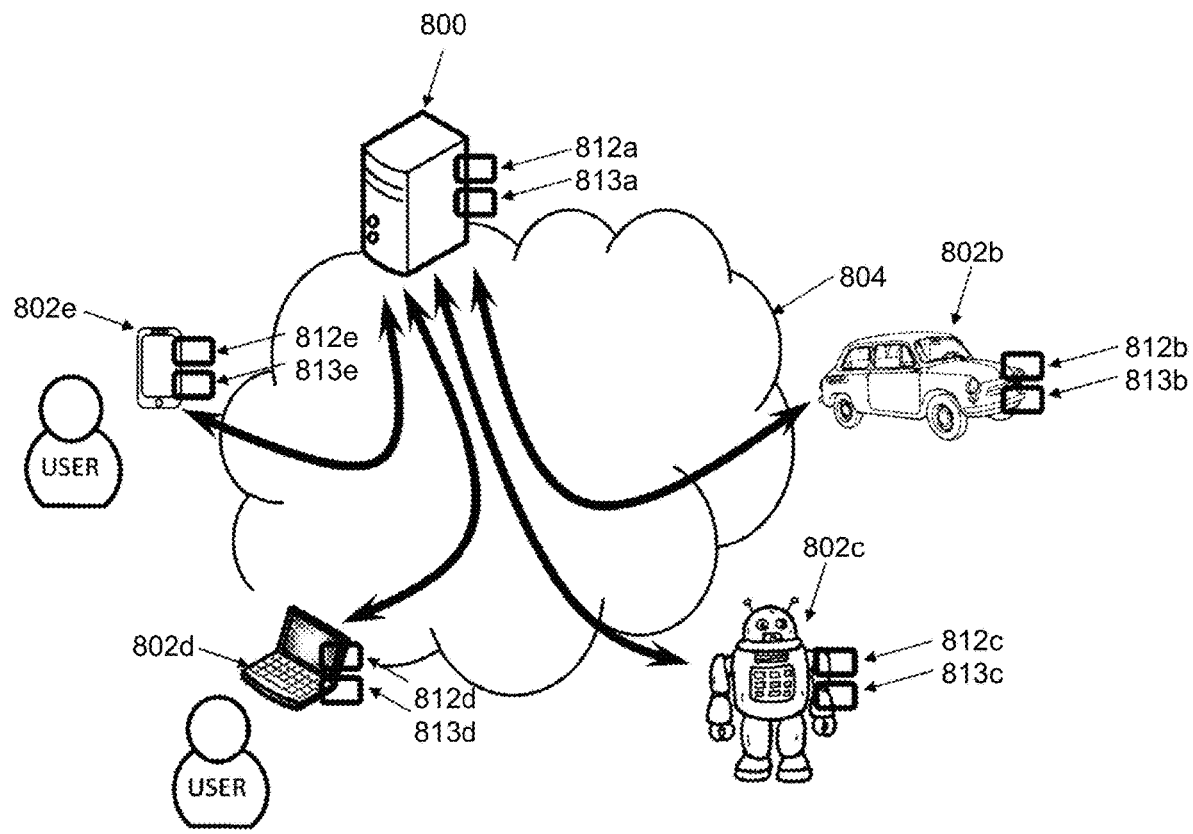
FIG. 8 illustrates an example computing environment in which the disclosed methods may be performed.

The above-mentioned systems, methods and embodiments may be implemented within an architecture such as that illustrated in FIG. 8, which comprises server 800 and one or more client devices 802 that communicate over a network 804 which may be wireless and/or wired, such as the Internet, for data exchange. Server 800 and the client devices 802 each include processor 812 and memory 813, such as but not limited to random-access memory (RAM), hard disks, solid state disks, or other non-volatile storage media. Memory 813 may also be provided in whole or in part by external storage in communication with the processor 812. It will be appreciated that the processor 812 can include either a single processor or multiple processors operating in series or in parallel, and that the memory 813 can include one or more memories, including combinations of memory types and/or locations. Server 800 may also include, but are not limited to, dedicated servers, cloud-based servers, or a combination.

Client devices 802 may be any processor-based device, terminal, etc., and/or may be embodied in a client application executable by a processor-based device, etc. Client devices may be disposed within the server 800 and/or external to the server (local or remote, or any combination) and in communication with the server. Example client devices 802 include, but are not limited to, autonomous vehicle 802b, robot 802b, computer 802d, or cell phone 802e. Client devices 802 may be configured for sending data to and/or receiving data from the server 800, and may include, but need not include, one or more output devices, such as but not limited to displays, printers, etc. for displaying or printing results of certain methods that are provided for display by the server. Client devices may include combinations of client devices.

More precisely, in an embodiment, the system according to the embodiments of FIGS. 1-3 may be implemented by server 800. For example, server 800 may implement the system 40 for training a machine-learning system for multi-document summarization. Server 800 may then perform generation of enriched training data, training of multi-source transformer neural network 45, and store training parameters of the multi-source transformer neural network 45. Server 800 may receive input texts from any suitable source, e.g., from memory 813 (as nonlimiting examples, internal storage, an internal database, etc.), from external storage connected locally or over the network 804 (e.g., an external database (not shown)), from one or more client devices 802, etc., and generate one or more summaries of input texts. Generation of summaries may be performed automatically (e.g., without a specific request by a client or user, on a periodic or continuous basis, etc.) in response to a request or event, or any combination. Previously generated summaries may be updated, for instance, as additional input texts are provided. In some example embodiments provided herein, training and/or inference may be performed offline or online (e.g., at run time), in any combination. Generated summaries can be output (e.g., displayed, transmitted, provided for display, printed, etc.) and/or stored for retrieving and providing on request.

In some embodiments, server 800 may process a request received by a client device 802 for a previously generated summary of input texts, or for generation of a summary of input texts. The input texts may be provided with the request, and/or the input texts may have been otherwise provided and/or stored. Server 800 may proceed according to method 300 described above, generate a summary of the input texts employing the stored trained multi-source transformer neural network 45, and provide the generated summary to the requesting client device 802.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as computer program products with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor.

Implementation of an Example Model

The example model was implemented with PyTorch, fairseq and Scikit-learn for the classifiers. SentencePiece (Kudo and Richardson, "*SentencePiece: A simple and language-independent sub-word tokenizer and de-tokenizer for neural text processing*", in Proceedings of the 2018 Conference on Empirical Methods in Natural Language Processing) was used as a tokenizer with a vocabulary size of 32,000.

Hyperparameters of the multi-source transformer model included the size of the model, $d_{model}$=1024, number of heads $n_{heads}$=16, number of layers L=6, and dropout=0.1. In optimization, a Nesterov accelerated stochastic gradient descent optimizer with a learning rate of 0.01 has been used. All models were trained for a total of 80,000 steps across 25 generations with a linear warm-up for the first 8,000 steps. For inference, a beam size of 35 was used and hypotheses that contain twice the same trigram, were discarded.

Evaluation

The disclosed model was evaluated for two large datasets, a Yelp dataset (Chu and Liu) containing approximately one million values for around 40,000 businesses, and a Rotten Tomatoes dataset constructed by Wang and Ling in "*Neural Network based Abstract Generation for Opinions and Arguments*", in Proceedings of the 2016 Conference of the North American Chapter of the Association for Competition Linguistics: Human language technologies, pages 47-55. From the Yelp dataset for each business, the best candidates were used as reference summaries, either the top 15% or the top 100 reviews (T=100), whichever is smaller. For each reference summary, its eight most similar reviews were taken to form the subset $D_i$, as explained above. For the Yelp dataset, around 440,000 training examples for 22,500 businesses were obtained. Similarly, for the Rotten Tomatoes dataset, either the top 1% of best summaries or the top 150 top summaries (T=150), whichever is smaller, were selected. For each of these top-ranked summaries, eight most similar reviews were selected as corresponding input text subsets, yielding around 170,000 training examples representing 3,700 movies.

TABLE 1

|  | Model | ROUGE-1 | ROUGE-2 | ROUGE-L | $F_{BERT}$ | Sentiment Acc. | $F_{category}$ |
|---|---|---|---|---|---|---|---|
| YELP | Textrank (Mihalcea & Tarau, 2004) | 28.3 | 4.2 | 14.9 | 84.1 | 82.0 | 53.4 |
|  | Lexrank (Radev et al., 2004) | 27.4 | 3.9 | 14.9 | 84.2 | 83.5 | 54.1 |
|  | Opinosis (Ganesan et al., 2010) | 26.8 | 3.4 | 14.2 | 81.2 | 80.5 | 53.0 |
|  | H-VAE (Brazinskas et al., 2019) | 29.5 | 5.3 | 18.1 | — | — | — |
|  | Meansum (Chu & Liu, 2019) | 28.6 | 3.8 | 15.9 | 86.5 | 83.5 | 50.3 |
|  | Disclosed Model | 32.8 | 8.7 | 18.8 | 86.8 | 83.9 | 55.2 |
| RT | Textrank | 19.0 | 4.3 | 19.4 | 85.3 | 75.8 | 41.6 |
|  | Lexrank | 17.6 | 3.5 | 18.2 | 85.3 | 73.2 | 40.9 |
|  | Opinosis | 15.2 | 2.9 | 16.9 | 84.1 | 67.5 | 37.1 |
|  | Disclosed Model | 20.9 | 4.5 | 22.7 | 85.3 | 70.9 | 43.6 |

Table 1 shows a comparison of the disclosed system with three unsupervised comparison systems, TextRank (Mihalcea and Tarau, cited above), LexRank (Radev et al, "Centroid-based Summarization of Multiple Documents", Information Processing and Management 46, 40(6):919-938, 2004), which are extractive systems based on the page rank algorithm, and Opinosis (Ganesan et al, cited above), which is an abstractive graph-based system. The openly available Python implementations for TextRank and LexRank were employed with default parameters of the implementations, while for Opinosis the publicly available version with default hyper-parameters was employed.

Table 1 also comprises a comparison with neural unsupervised summarization systems of MeanSum (Chu and Liu) and H-VAE (Bražinskas et al, cited above). For H-VAE, which was not available, results from the publication were employed, while for MeanSum the provided checkpoint was re-run. Table 1 shows ROUGE-F-{1, 2, L} metrics (Lin, "ROUGE: A Package for Automatic Evaluation of Summaries", in Text Summarization Branches Out, pp. 74-81, 2004). A BERTscore (Zhang et al, "BERTScore: Evaluating Text Generation with BERT", in International Conference on Learning Representations, 2020) that employs a pre-trained BERT system to compute the semantic similarity between a candidate summary and the reference summary. The metrics Dist-n and $Dist_c$-n (n=1, 2, 3) score the percentage of distinct n-grams in the generated text on the summary level or the corpus level (Li et al, "A Diversity-Promoting Objective Function for Neural Conversation Models", in Proceedings of the 2016 Conference of the North American Chapter of the Association for Computational Linguistics: Human language technologies, pp. 110-119). Dist-n is an indicator for a repetitiveness within a single summary, while $Dist_c$-n indicates the diversity of different generations. A classifier was used to assess the sentiment of the summary and check whether it is consistent with the sentiment of input reviews.

Table 1 also comprises results of a micro F-score of a multi-level category classifier to check whether the correct product category can be inferred from the summary. As is evident from Table 1, the disclosed example multi-input self-supervised model consistently performed better in a Yelp dataset than the comparative models.

For the Rotten Tomatoes dataset, the comparative models were chosen to only comprise the graph-based unsupervised methods because the released pre-trained MeanSum model did not cover the domain of movie reviews. As is evident, the disclosed multi-input self-supervised model performed better, or at least equal, over all scores apart from the sentiment accuracy. The lower score in sentiment accuracy may be due to the fact that the summaries in the Rotten Tomatoes dataset are critical reviews that are written in a very different style than the reference summaries.

TABLE 2

|  | Model | Dist-1 | Dist-2 | Dist-3 | $Dist_c$-1 | $Dist_c$-2 | $Dist_c$-3 |
| --- | --- | --- | --- | --- | --- | --- | --- |
| Extract | Textrank | 0.68 | 0.95 | 0.992 | 0.135 | 0.62 | 0.90 |
|  | Lextrank | 0.70 | 0.96 | 0.994 | 0.144 | 0.6 | 0.92 |
|  | Opinosis | 0.72 | 0.94 | 0.97 | 0.159 | 0.66 | 0.92 |
| Abstr. | Meansum | 0.72 | 0.95 | 0.98 | 0.091 | 0.39 | 0.67 |
|  | Disclosed Model | 0.79 | 0.99 | 1.00 | 0.097 | 0.41 | 0.64 |

Table 2 displays results of a referenceless evaluation where the number of distinct n-grams are scored on the summary level and on the corpus level. As is evident on the summary level, the disclosed model outperforms the comparative models which means that the multi-input self-supervised model is capable of generating richer and less repetitive summaries. On the level of all generations, the disclosed model generates text with more diversity than MeanSum. However, extractive models have more diversity on the corpus level as they directly copy from each input separately, while abstractive models tend to learn repetitive patterns present in the training set.

FIG. 9 shows summaries generated by different models from the same input. Text 902 is a text generated by the disclosed model. Words highlighted in darker shade are words that exactly match words from the input texts, while words highlighted in lighter shade have no support in the input texts. The disclosed model hence learned, in this example, to copy aspects of the input documents such as the restaurant's name, "Capriotti's", and the menu item "the Bobbie" which can be attributed to the cross-attention mechanism in the disclosed model. For comparison, a text 904 generated by MeanSum, and a text 906 generated by TextRank are displayed which copy fewer aspects of the input documents to the summary.

TABLE 3

| Disclosed Model (DM) | Quality | | | | | | Speed |
| --- | --- | --- | --- | --- | --- | --- | --- |
|  | ROUGE-1 | ROUGE-2 | ROUGE-L | $F_{BERT}$ | Sentiment Acc. | $F_{category}$ | Train. (wps) |
| $DM_{Parallel}$ | 32.8 | 8.7 | 18.8 | 86.8 | 83.9 | 55.2 | 3785 |
| $DM_{Mean}$ | 29.4 | 5.3 | 17.2 | 87.6 | 83.4 | 56.2 | 8075 |
| $DM_{Parallel}$ - cntrl. | 25.3 | 3.7 | 15.5 | 85.2 | 76.9 | 43.9 | 7609 |
| $DM_{Mean}$ cntrl. | 27.5 | 5.3 | 17.1 | 87.3 | 80.0 | 52.1 | 8714 |

Table 3 shows results of an ablation study of removing the control codes that are included in the training data, as described above. Removing the control codes degrades sentiment and category significantly and also degrades the ROUGE scores. Changing the decoder/encoder attention from the parallel implementation explained above with reference to FIG. 6, to the mean implementation described above with reference to FIG. 7, also degrades the ROUGE scores.

TABLE 4

| Faithfulness | Gold | Disclosed Model | Meansum |
|---|---|---|---|
| Correct | 67 | 50 | 47 |
| Incorrect | 3 | 4 | 12 |
| % Correct | 95.71 | 92.59 | 79.66 |

Table 4 shows results of a human evaluation of the summaries. To produce the results of Table 4, ninety-four summaries were annotated on a crowd sourcing platform. Three versions of summaries were compared, the reference summary, a summary generated by MeanSum, and a summary produced by the disclosed model. Human users were asked if "the summary contains correct information, given the original reviews". In total, 3×94 tasks were given, each task was labelled by three annotators, restricted to experienced English-speaking workers, who were paid 0.50 USD per annotation. As Table 4 shows, 92.6% of the summaries generated by the disclosed system were considered factually correct, compared to 95.7% of the reference summaries and only 79.7% of the summaries generated with MeanSum.

Figure 11:
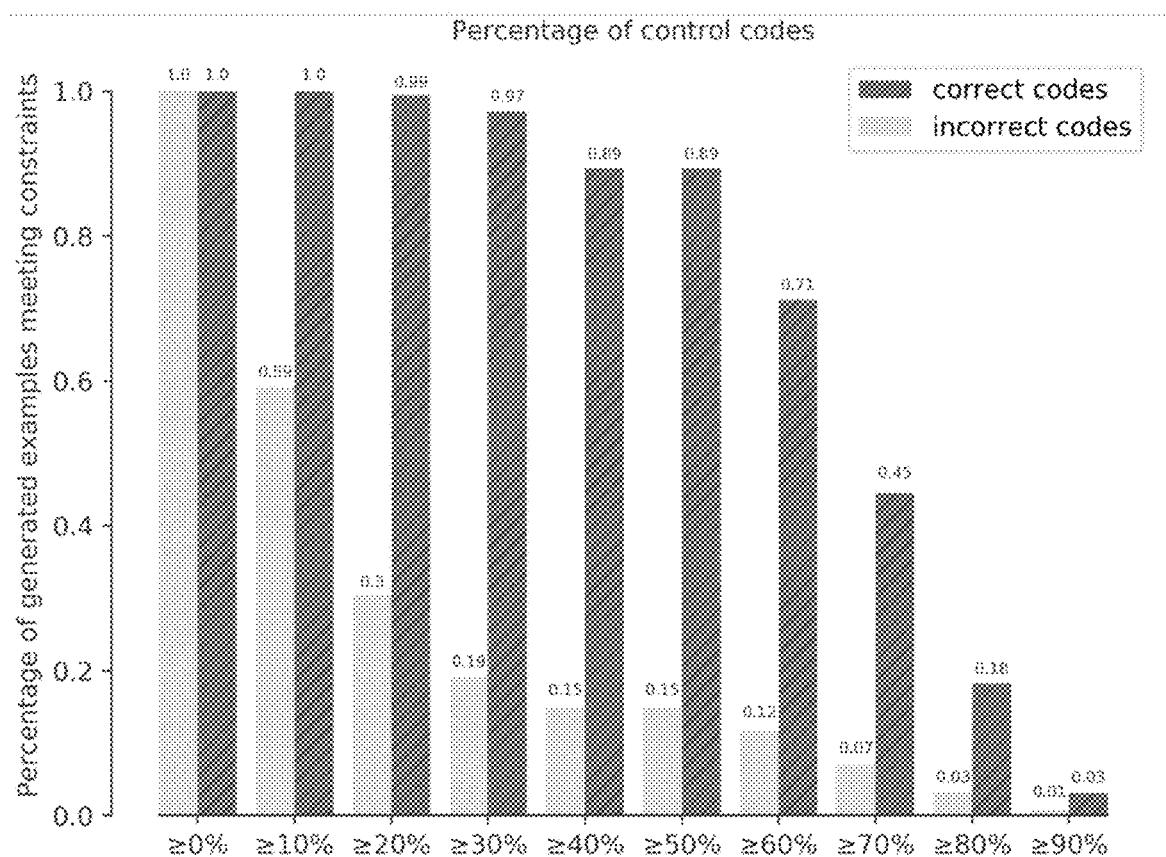
FIG. 11 is a diagram showing the proportion of control codes that occur in the output text generated by the disclosed system.

FIGS. 10 and 11 relate to another analysis to score how rigidly the disclosed model follows the control codes. A set of 500 input reviews for 279 venues from the Yelp set were employed. For each input example, 8 control codes were randomly sampled from the control codes inferred as explained above. These 8 control codes are referred to as "correct control codes". The decoder was run using the correct control codes as prompt, and the proportion of the correct control codes that also occur in the generated output text was counted. For comparison, this process is repeated with sampling 8 control codes that do not occur in the input text, which are referred to as "incorrect control codes".

FIG. 10 exemplarily shows summaries 1002, 1004 generated from a same input when the model is provided with correct control codes, and summaries 1006, 1008 generated from the same input when the model is provided with incorrect control codes. Words highlighted in darker shade are the correct control codes, while words highlighted in lighter shade are the incorrect control codes.

In FIG. 11, the proportion of fed control codes that occur in the generated output text is displayed. As is evident, the disclosed system tends to comply with the correct control codes so that 89% of the summaries contain more than 50% of the control codes found. The columns in lighter shade show that fraction of incorrect control codes that occur in the output texts when the system is fed with incorrect control codes.

The results of FIG. 11 imply that the multi-source transformer neural network ignores control codes when they do not occur in the input texts, i.e., when arbitrary codes are fed that are not constructed as explained above with reference to FIG. 1.

General

Thus, methods and systems disclosed herewith allow for, among other benefits, self-supervised training for multi-input summarization. Control codes are also learned in a self-supervised method and allow one to steer an extended transformer model to produce high-quality summaries of input texts.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

The invention claimed is:

1. A method of generating enriched training data for a multi-source transformer neural network for generation of a summary of one or more passages of input text using a processor, the method comprising:
   creating, from a plurality of input text sets, training points each comprising an input text subset of the input text set and a corresponding reference input text from the input text set, wherein creating the training points comprises providing a similarity between the reference input text and the input text subset, wherein the size of the input text subset is a predetermined number;
   training a plurality of processor-based classifiers for a plurality of categorical labels, each classifier classifying whether an input text falls under a categorical label from the plurality of categorical labels;
   collecting, for each training point, weights for reference features from the plurality of trained classifiers, comprising selecting the reference features from the trained classifiers corresponding to categorical labels of the respective reference input text;
   selecting, for each input text in the input text subsets of the training points, based on the weights for the reference features, control codes from the reference features; and
   enriching the input text with the selected control codes to generate enriched training data.

2. The method of claim 1, further comprising training a multi-source transformer neural network with the enriched training data, the multi-source transformer neural network being implemented using a processor, the multi-source transformer neural network comprising an encoder pipeline of multi-input encoder layers and a corresponding decoder pipeline of cross-attention decoder layers, wherein a number of encoders comprised in each of the encoder layers corresponds to the predetermined number, said multi-source transformer neural network being adapted to generate a summary of passages of input text when the passages of input text are not in the plurality of input text sets.

3. The method of claim 2, wherein enriching the input text with the selected control codes comprises providing the respective control codes to each cross-attention decoder layer of the multi-source transformer neural network to restrain an output of the cross-attention decoder layer.

4. The method of claim 2, wherein training the multi-source transformer neural network with the enriched training data comprises feeding each of the encoders of a first encoder layer of the encoder pipeline with the enriched input text from the subsets.

5. The method of claim 1, wherein selecting, for each input text in the input text subsets of the training points, the control codes comprises selecting a predetermined number of highest weighted reference features that correspond to words in the corresponding reference input text.

6. The method of claim 1, wherein training the plurality of classifiers comprises employing meta-data annotations of the input texts as categorical labels.

7. The method of claim 6, wherein training the plurality of classifiers further comprises employing a determined polarity of the input text.

8. The method of claim 1, wherein providing the similarity between the reference input text and the input text subset comprises, for each input text, selecting the input text subset to achieve a maximum similarity between the reference input text and the input text subset, the similarity being determined as a sum of similarity measures between the reference input text and each of the input texts in the input text subset.

9. The method of claim 8, wherein providing the similarity between the reference input text and the input text subset further comprises ranking pairs of input texts and corresponding subsets by the similarity between the respective input text and the respective corresponding input text subset and choosing a predetermined number of highest-ranking pairs as the training points.

10. The method of claim 1, wherein training the plurality of classifiers for the plurality of categorical labels comprises training each of one or more linear support vector machines for classifying whether an input text falls under one of the categorical labels.

11. The method of claim 1 wherein training the multi-source transformer neural network with the training data comprises calculating averages of keys and averages of values of each of the encoders and configuring a multi-head attention network to attend to a set of decoder queries and to the averages of keys and the averages of values.

12. The method of claim 1, wherein said creating training points is self-supervised.

13. A method of generating a summary of passages of input text, the method comprising:
   receiving the passages of input text by a trained multi-source transformer neural network according to claim 2;
   determining a set of repeated control codes from the received plurality of input texts;
   providing the determined set of repeated control codes as a prefix to the decoder pipeline of the trained multi-source transformer neural network; and
   generating, using the decoder pipeline, the summary of the passages of input text.

14. The method of claim 13, wherein the passages of input text are not in the plurality of input text sets.

15. The method of claim 13, wherein each of the passages of input text reflect opinions of a product or service offered by an entity.

16. The method of claim 13, further comprising:
   transmitting, in response to a request, the generated summary of the passages of input text for display on a display.

17. The method of claim 16, wherein the trained multi-source transformer neural network is provided on a server, the request is received from a client, and the summary is transmitted to the client for display on a display of a client device in response to the request.

18. A method of generating enriched training data for a multi-source transformer neural network for generation of a summary of one or more passages of input text using a processor, the method comprising:
   creating, from a plurality of input text sets, training points each comprising an input text subset of the input text set and a corresponding reference input text from the input text set, wherein creating the training points comprises providing a similarity between the reference input text and the input text subset, wherein the size of the input text subset is a predetermined number;

for each created training point, selecting one or more reference features corresponding to categorical labels of the respective reference input text;

selecting, for each input text in the input text subsets of the training points, control codes from the selected reference features; and enriching the input texts in the input text subsets of the training points with the selected control codes to generate enriched training data.

19. The method of claim 18, wherein the creating of training points is self-supervised.

20. The method of claim 18, further comprising:
training a multi-source transformer neural network with the enriched training data, the multi-source transformer neural network being implemented using a processor and comprising an encoder pipeline of multi-input encoder layers and a corresponding decoder pipeline of cross-attention decoder layers, wherein a number of encoders comprised in each of the encoder layers corresponds to the predetermined number, said multi-source transformer neural network adapted to generate a summary of input text when the input text is not in the plurality of input text sets.

21. The method of claim 20, wherein enriching the input text with the selected control codes comprises providing the respective control codes to each cross-attention decoder layer of the multi-source transformer neural network to restrain an output of the cross-attention decoder layer.

22. The method of claim 20, wherein training the multi-source transformer neural network with the enriched training data comprises feeding each of the encoders of a first encoder layer of the encoder pipeline with the enriched input text from the subsets.

23. A method for generating a summary of passages of input text, the method comprising:
receiving the passages of input text by a trained multi-source transformer neural network according to claim 20;
determining a set of repeated control codes from the received plurality of input texts;
providing the determined set of repeated control codes as a prefix to the decoder pipeline of the trained multi-source transformer neural network; and
generating, using the decoder pipeline, the summary of the passages of input text.

24. The method of claim 23, wherein the passages of input text are not in the plurality of input text sets.

25. The method of claim 18, wherein each of the passages of input text reflect opinions of a product or service offered by an entity.

26. A machine-learning system implemented using a processor for generating enriched training data for a multi-source transformer neural network for summarizing input text, the system comprising:
a relevance analysis module configured to create, from an input text set, training points comprising a reference input text from the input text set and an input text subset of the input text set, wherein creating the training point comprises selecting an input text as reference input text and optimizing a similarity of the corresponding input text subset;
a plurality of classifiers for classifying whether an input text falls under a categorical label; and
processor-based means for collecting, for each training point, weights for reference features from the plurality of trained classifiers, comprising selecting the reference features from the trained classifiers corresponding to categorical labels of the respective reference input text and for selecting, for each input text in the input text subsets of the training points, control codes from the reference features and enriching the input text with the respectively selected control codes to generate enriched training data.

27. The system of claim 26, further comprising the multi-source transformer neural network adapted to generate a summary of input text when the input text is not in the plurality of input text sets, the multi-source transformer neural network comprising an encoder pipeline of multi-input encoder layers and a corresponding decoder pipeline of cross-attention decoder layers, wherein each cross-attention decoder layer comprises a multi-input multi-head attention network (506), wherein a number of encoders comprised in each of the encoder layers corresponds to a predetermined number.

28. The system of claim 27, wherein the multi-source multi-head attention network comprises a plurality of multi-head attention network corresponding to the predetermined number, wherein each multi-head attention network is configured to receive keys and values from one of the encoders of the last multi-input encoder layer.

29. The system of claim 27, wherein the multi-source multi-head attention network comprises an averaging component and a multi-head attention network, wherein the averaging component is configured to calculate averages of keys and averages of values, the keys and values respectively provided by the encoders of the last multi-input encoder layer, and wherein the multi-head attention network is configured to attend to a set of decoder queries and to the average of keys and the average of values provided by the averaging component.

30. A non-transitory computer-readable medium having executable instructions stored thereon, the executable instructions when read causing a processor to perform a method for generating enriched training data for a multi-source transformer neural network for generation of a summary of one or more passages of input text, the method comprising:
creating, from a plurality of input text sets, training points each comprising an input text subset of the input text set and a corresponding reference input text from the input text set, wherein creating the training points comprises providing a similarity between the reference input text and the input text subset, wherein the size of the input text subset is a predetermined number;
training a plurality of classifiers for a plurality of categorical labels, each classifier classifying whether an input text falls under a categorical label from the plurality of categorical labels;
collecting, for each training point, weights for reference features from the plurality of trained classifiers, comprising selecting the reference features from the trained classifiers corresponding to categorical labels of the respective reference input text;

selecting, for each input text in the input text subsets of the training points, based on the weights for the reference features, control codes from the reference features; and enriching the input text with the selected control codes to generate enriched training data.

* * * * *